(12) United States Patent
Long

(10) Patent No.: US 8,978,507 B2
(45) Date of Patent: Mar. 17, 2015

(54) BALANCING MECHANISM AND ROBOT USING THE SAME

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/446,215

(22) Filed: Apr. 13, 2012

(65) Prior Publication Data
US 2013/0061707 A1 Mar. 14, 2013

(30) Foreign Application Priority Data

Sep. 13, 2011 (CN) .......................... 2011 1 0268970

(51) Int. Cl.
| | |
|---|---|
| *B25J 17/00* | (2006.01) |
| *B25J 17/02* | (2006.01) |
| *B25J 18/00* | (2006.01) |
| *B25J 19/00* | (2006.01) |

(52) U.S. Cl.
CPC ............ *B25J 19/0016* (2013.01); *Y10S 901/48* (2013.01); *Y10S 901/15* (2013.01)
USPC .............................. 74/490.01; 901/48; 901/15

(58) Field of Classification Search
USPC ............... 74/490.01, 490.02, 490.03, 490.04, 74/490.05, 490.06; 901/14, 15, 27, 28, 48, 901/50
See application file for complete search history.

(56) References Cited

U.S. PATENT DOCUMENTS

| | | | | |
|---|---|---|---|---|
| 8,528,439 | B2 * | 9/2013 | Markert ..................... | 74/490.05 |
| 2001/0022112 | A1 * | 9/2001 | Bayer et al. ................ | 74/490.01 |
| 2002/0162414 | A1 * | 11/2002 | Lundstrom et al. ......... | 74/490.01 |
| 2004/0093975 | A1 * | 5/2004 | Amparore et al. ......... | 74/490.01 |
| 2010/0043587 | A1 * | 2/2010 | Broberg et al. ............ | 74/490.01 |

FOREIGN PATENT DOCUMENTS

| | | |
|---|---|---|
| DE | 102010005103 A1 | 7/2011 |
| EP | 0947296 A2 | 10/1999 |
| JP | 2002-283274 A | 10/2002 |

\* cited by examiner

*Primary Examiner* — David M Fenstermacher
*Assistant Examiner* — Jake Cook
(74) *Attorney, Agent, or Firm* — Novak Druce Connolly Bove + Quigg LLP

(57) ABSTRACT

A balancing mechanism for a robot configured for lifting heavy weights comprises a hollow balancing body comprising an opening; an elastic assembly received in the balancing body and a pulling rod assembly received in the balancing body and hinged to a robot arm of the robot. One end of the pulling rod assembly resists the elastic assembly, and another opposite end of the pulling rod assembly extends out from the balancing body through the opening, the pulling rod assembly is movably assembled with the balancing body via the elastic assembly to make the elastic assembly capable of producing a balancing moment against the gravity moment of the robot arm.

19 Claims, 4 Drawing Sheets

BALANCING MECHANISM AND ROBOT USING THE SAME

BACKGROUND

1. Technical Field

The present disclosure relates to a balancing mechanism and a robot using the balancing mechanism.

2. Description of Related Art

Industrial robots used in manufacturing, assembling, painting and other areas are employed for bad environments or to do heavy or hard work. Robots with long arms may grasp and move heavy objects for an extended distance. However, a weight of these objects may be such that some robots with reduced balance and stability will be easily destroyed, or at least their precision working in the placement of objects will be disturbed. Balancing mechanisms are installed at these robots to improve the balance and stability thereof. The structures of the balance mechanisms in related art are complex.

Therefore, there is room for improvement within the art.

DETAILED DESCRIPTION

Figure 1:
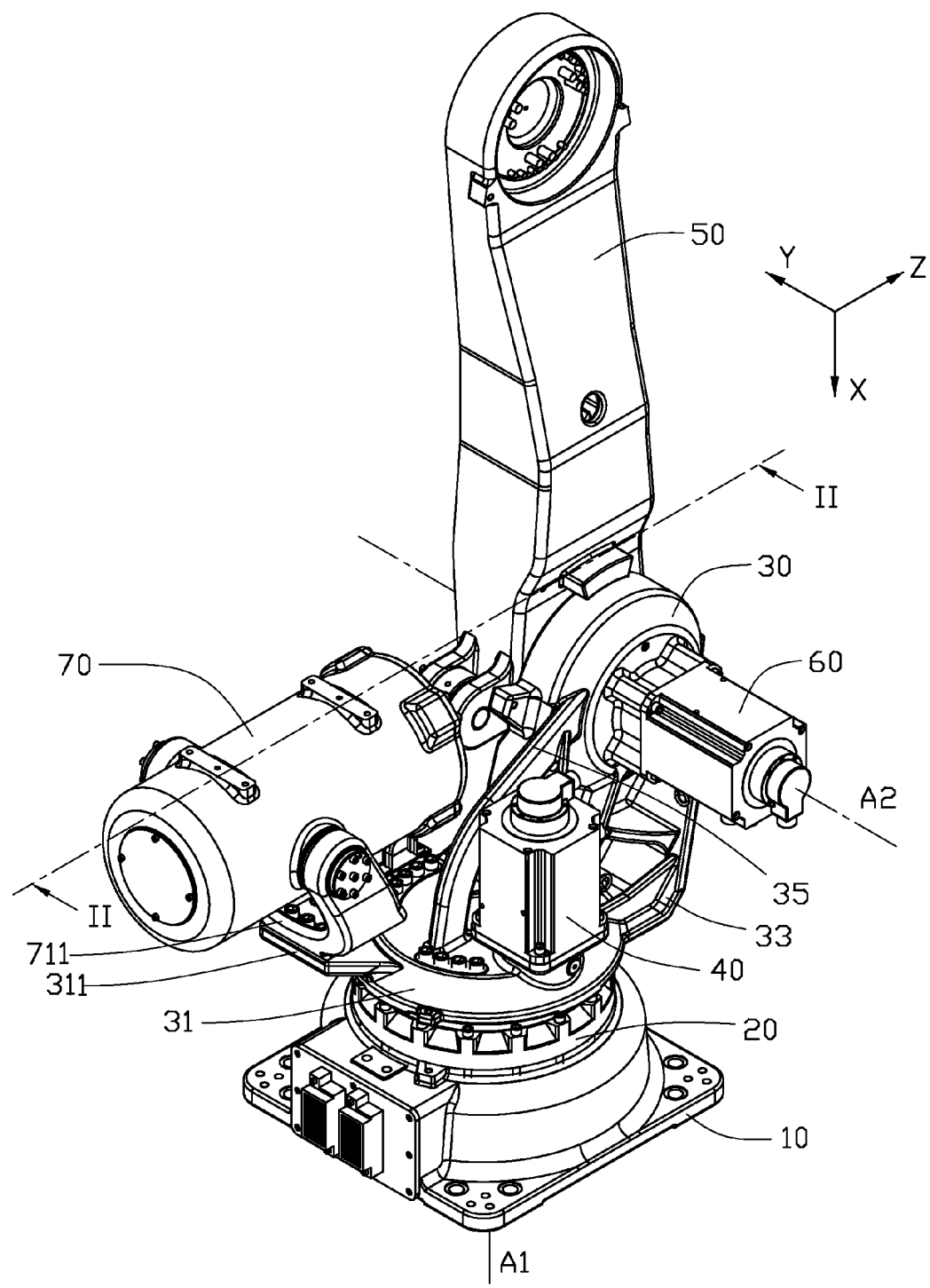
FIG. 1 is an isometric view of a robot.
Figure 2:
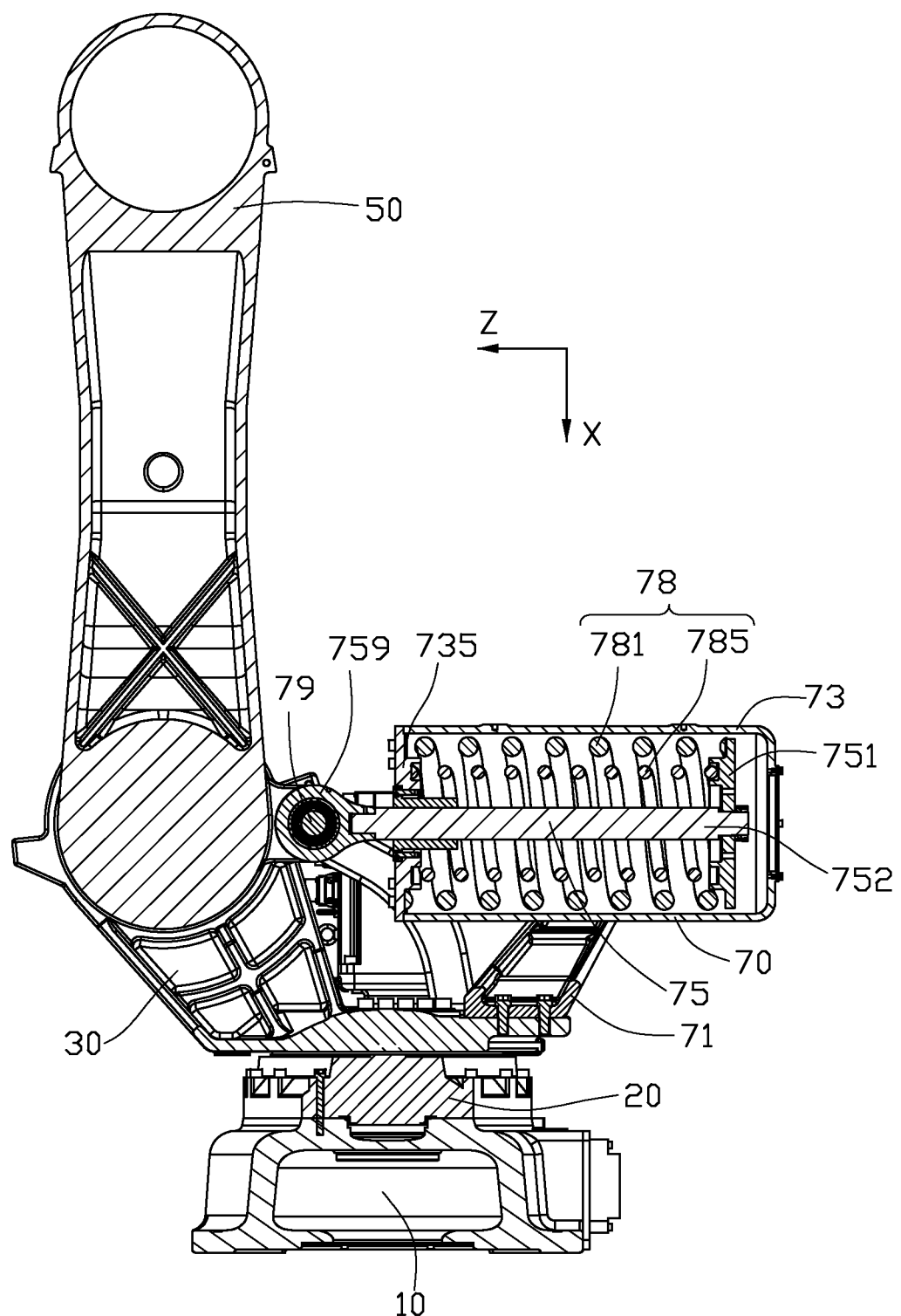
FIG. 2 is a cross section of the robot of FIG. 1, taken along line II-II.

Referring to FIGS. 1 and 2, an embodiment of a robot 100 includes a base 10, a deceleration machine 20, a support body 30, a first driving mechanism 40, a robot arm 50, a second driving mechanism 60 and a balancing mechanism 70. The deceleration machine 20 is positioned at the base 10. The support body 30 is rotatably connected with the deceleration machine 20. The first driving mechanism 40 is installed at the support body 30 and connects with the deceleration machine 20 for driving the support body 30 to rotate relative to the base 10. The robot arm 50 is rotatably positioned at the support body 30. The second driving mechanism 60 is mounted at the support body 30 and connects with the robot arm 50 for driving the robot arm 50 to rotate relative to the support body 30. The balancing mechanism 70 is mounted on the support body 30 and is hinged with the robot arm 50 for counter balancing the robot arm 50 and the base 10 to improve the balance of the robot 100.

Figure 3:
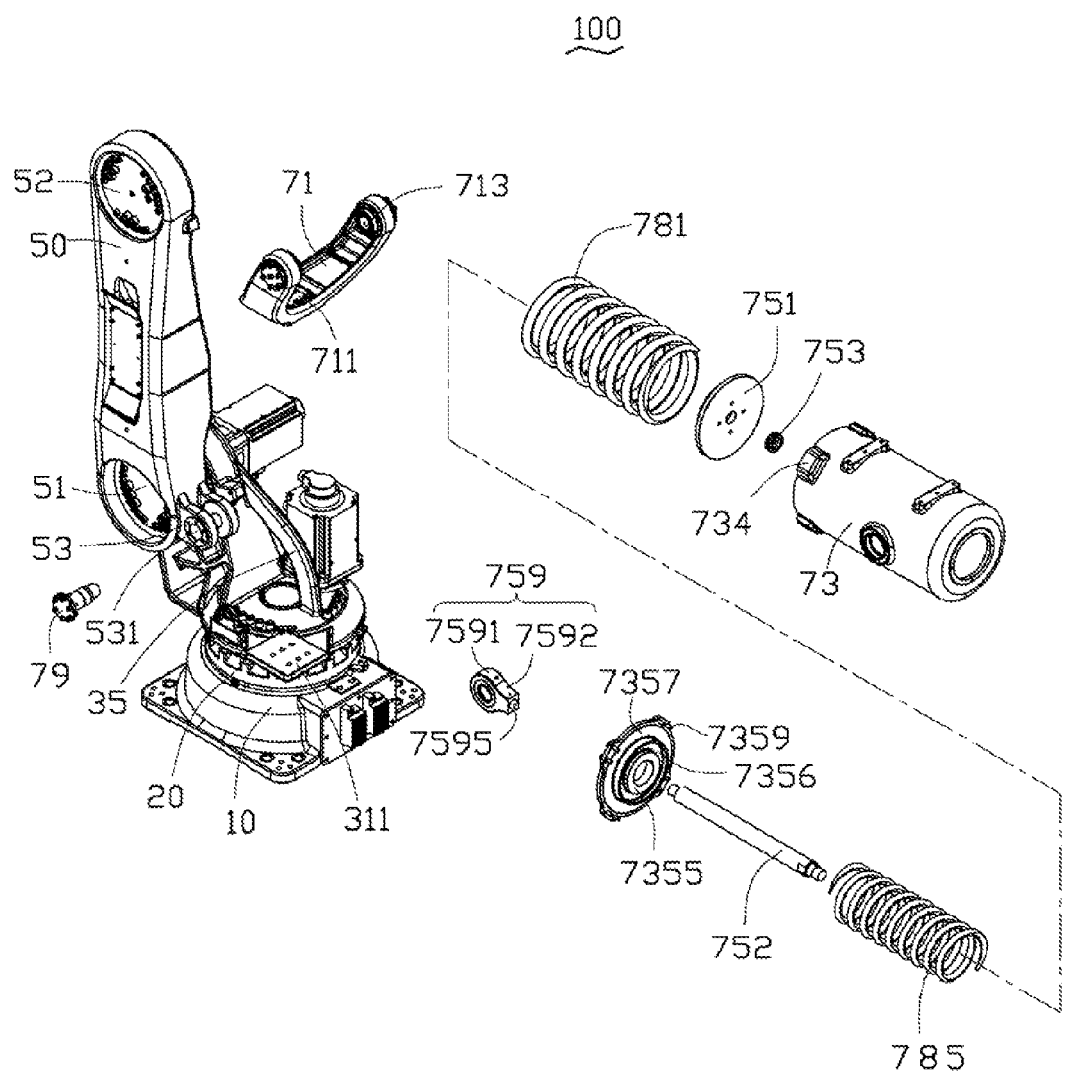
FIG. 3 is an isometric and exploded view of the robot of FIG. 1.
Figure 4:
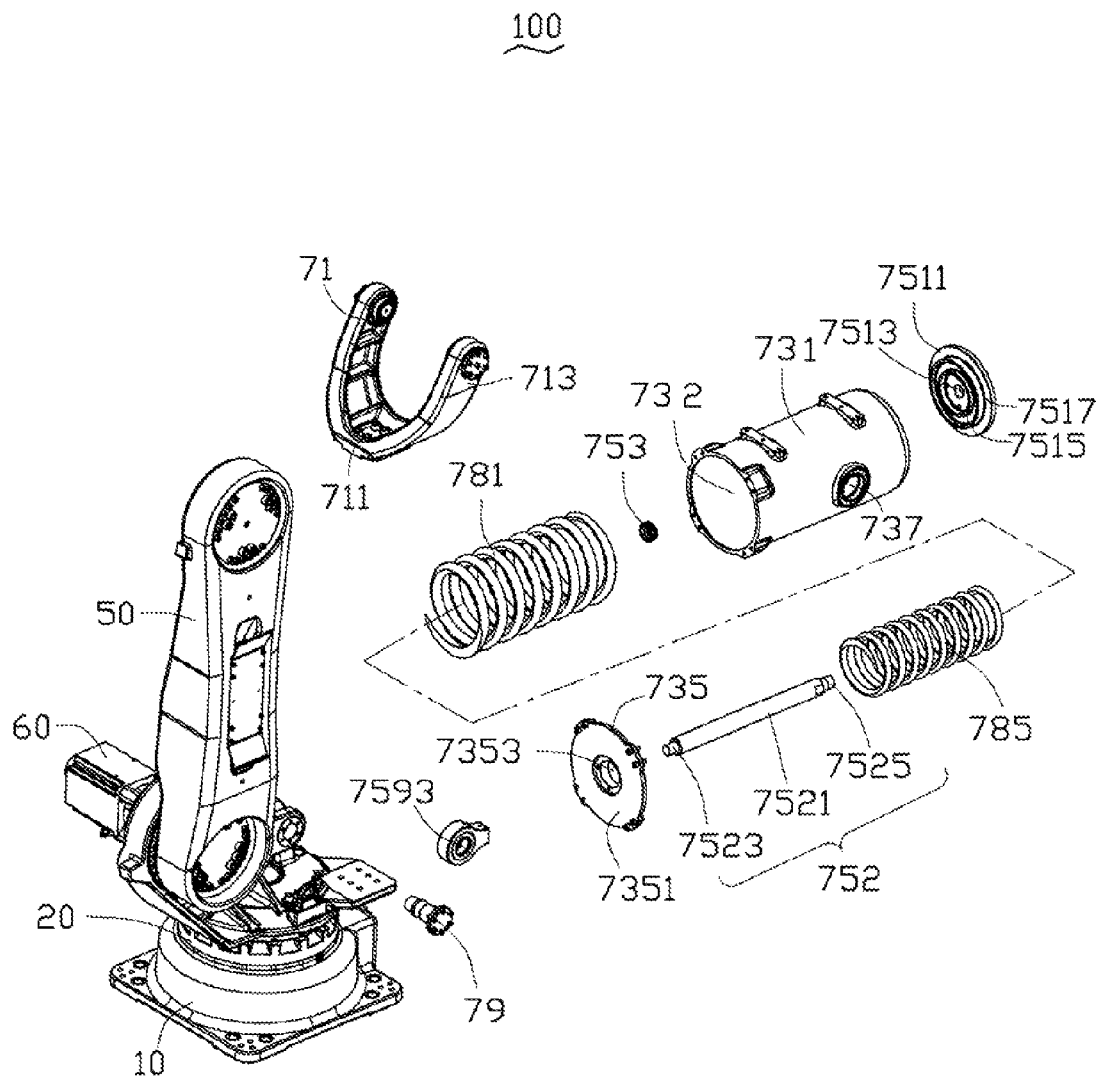
FIG. 4 is similar to FIG. 3, but viewed from another aspect.

Referring also to FIGS. 3 and 4, the base 10 is used for installing the robot 100 to the floor or other place, and defines a first axis Al perpendicular to the base 10. The deceleration machine 20 is positioned at the base 10.

The support body 30 is rotatably connected with the deceleration machine 20. The support body 30 includes a first connecting portion 31, a second connecting portion 33, and a third connecting portion 35. The first connecting portion 31 is rotatably connected with the base 10 via the deceleration machine 20. A mounting board 311 is formed at one end of the first connecting portion 31 which extends outward for installing the balancing mechanism 70. The second connecting portion 33 extends up from another end of the first connecting portion 31 opposite to the mounting board 311 of the first connecting portion 31. The third connecting portion 35 is an arcuate structure, extending from a top surface of the first connecting portion 31 and finally connecting with the second connecting portion 33 for enhancing the supporting effect.

The first driving mechanism 40 is positioned at the first connecting portion 31 of the support body 30 and connects with the deceleration machine 20. The first driving mechanism 40 is used for driving the support body 30 to rotate around the first axis A1. A first direction X axis is substantially parallel to the first axis A1. The robot arm 50 includes a first mounting end 51 and a second mounting end 52 opposite to the first mounting end 51. The first mounting end 51 is hinged with the second connecting portion 33 of the support body 30. A pair of ears 53 is separately formed on a side surface of the first mounting end 51 and each ear 53 extends towards the mounting board 311. A hinging hole 531 is defined through each ear 53. The second mounting end 52 is used for connecting with other robot arms (not shown) or other mechanisms (not shown). The second driving mechanism 60 is mounted at the second connecting portion 33 and connects to the first mounting end 51. The second driving mechanism 60 defines a second axis A2. The second axis A2 is substantially perpendicular to the first axis A1. A second direction Y axis is substantially parallel to the second axis A2. A third direction Z axis is defined to be substantially perpendicular to X and Y axes. The second driving mechanism 60 is used for driving the robot arm 50 to rotate around the second axis A2. In this illustrated embodiment, the second axis A2 is perpendicular to the first axis A1. The mounting board 311 is substantially parallel to Y and Z axes.

The balancing mechanism 70 is movably positioned at the mounting board 311 and hinges with the pair of ears 53 of the robot arm 50. The balancing mechanism 70 includes a bracket 71, a balancing body 73, a pulling rod assembly 75, an elastic assembly 78, and a fixing element 79. The bracket 71 is positioned at the mounting board 311 for supporting the balancing body 73. The balancing body 73 is rotatably positioned at the top of the bracket 71 and above the mounting board 311. The pulling rod assembly 75 is received in the balancing body 73 and extends toward the robot arm 50 to hinge with the two ears 53 via the fixing element 79. The elastic assembly 78 is received in the balancing body 73.

In the illustrated embodiment, the bracket 71 is a substantially U-shaped structure, which includes a fixing portion 711 and two supporting arms 713 extending from opposite sides of the fixing portion 711. The fixing portion 711 is installed on the mounting board 311. The fixing portion 711 extends along a direction substantially parallel to the Y axis. The fixing portion 711 is substantially parallel to the mounting board 311. The two supporting arms 713 extend toward a same side of the fixing portion 711. Each supporting arm 713 is inclined to a direction substantially parallel to the Z axis. The balancing body 73 is a substantially hollow cylinder, which includes a cylindrical housing 731 and a resisting member 735. The housing 731 forms an opening 732. Several fixing blocks 734 are separately formed at an outer round edge of the opening 732. Two pivoting portions 737 are formed oppositely at an outer surface of the housing 731 corresponding to the two supporting arms 713 for fixing the housing 731 and the bracket 71 together. The resisting member 735 is assembled to cover the opening 732. The resisting member 735 includes an outer surface 7351 and an inner surface 7355 opposite to the outer surface 7351. A first through hole 7353 is defined at the middle of the resisting member 735. A first annular resisting portion 7356 and a second annular resisting portion 7357 are separately formed at the inner surface 7355 around the first through hole 7353. The second annular resisting portion 7357 is away from the through hole 7353 and adjacent to the edge of the inner surface 7355. Several installing portions 7359 are formed at the flange of the resisting member 735 corresponding to the fixing blocks 734 for fixing the resisting member 735 to the housing 731.

The pulling rod assembly 75 includes a holding member 751, a pulling rod 752, a clamping member 753 and a connecting block 759. The holding member 751 is received in the housing 732. The pulling rod 752 is also received in the housing 732 and extends from the first through hole 7353 to connect with the connecting block 759. One end of the pulling rod 752 away from the connecting block 759 is connected to the holding member 751. The holding member 751 is a circular plate and forms a holding surface 7511 facing the resisting member 735. A second through hole 7513 is defined at the middle of the holding member 751. A first holding portion 7515 and a second holding portion 7517 are formed at the holding surface 7511 to correspond to the first annular resisting portion 7356 and the second annular resisting portion 7357 of the resisting member 735, respectively.

The pulling rod 752 includes a main body 7521, a first linking portion 7523 and a second linking portion 7525. The first linking portion 7523 and the second linking portion 7525 are positioned at two opposite ends of the main body 7521 and having smaller diameters than that of the main body 7521. The main body 7521 passes through the second through hole 7513. The second linking portion 7525 passes through the second through hole 7513, and is finally fixed by the clamping member 753, such that the holding member 751 is securely fixed in place. The connecting block 759 includes a joint 7591 and a mounting portion 7592 connected with the joint 7591. The joint 7591 is hinged with the pair of ears 53. A linking hole 7593 is defined in a center of the joint 7591 along an axis of the joint 7591 for hinging with the two ears 53. The mounting portion 7592 has a smaller width than that of the joint 7591. A mounting hole 7595 is defined at an end surface of the mounting portion 7592 away from the joint 7591. One end of the first linking portion 7523 away from the main body 7521 is positioned in the mounting hole 7595. In other embodiments, the holding member 751, the pulling rod 752 and the connecting block 759 can be made integrally.

The elastic assembly 78 is received in the balancing body 73 and sleeves on the pulling rod 752. The elastic assembly 78 is between the holding member 751 and the resisting member 735. The elastic assembly 78 includes a first elastic member 781 and a second elastic member 785 received in the first elastic member 781. Both the first and the second elastic members 781, 785 are coil springs and sleeve on the pulling rod 752. The first elastic member 781 resists between the second annular resisting portion 7357 and the second holding portion 7517. The second elastic member 785 resists between the first annular resisting portion 7356 and the first holding portion 7515. In other embodiments, the elastic assembly 78 can be only one elastic member, or include several elastic members; the elastic assembly 78 can resist between a flange of the opening 732, and the holding member 751, and the resisting member 735 can be omitted; the elastic assembly 78 is not required to sleeve the passing rod 752, the elastic assembly 78 may be just configured between the holding member 751 and the resisting member 735.

In assembly, the deceleration machine 20 is positioned at the base 10, the support body 30 is rotatably installed at the deceleration machine 20, and the first mounting end 51 of the robot arm 50 is rotatably positioned at the second connecting portion 33 of the support body 30. The first driving mechanism 40 and the second driving mechanism 60 are mounted on the support body 30. The second linking portion 7525 passes through the second through hole 7513 and is finally fixed by the clamping member 753. The elastic assembly 78 sleeves on the pulling rod 752. The first linking portion 7523 passes through the resisting member 735 and goes into the mounting hole 7595 for connecting with the connecting block 759. The holding member 751, the pulling rod 752, the clamping member 753 and the elastic assembly 78 are placed into the balancing body 73, then the resisting member 735 is fixed to the balancing body 73 to cover the opening 732. The bracket 71 is installed at the mounting board 311, and the balancing body 73 is rotatably mounted at the two supporting arms 713. Finally, the fixing element 79 passes through the hinging hole 531, the mounting hole 7595, and through another hinging hole 531 for hinging the connecting block 759 with the robot arm 50.

When the robot 100 is working, the robot arm 50 rotates counterclockwise around the second axis A2. The pulling rod 752 is pulled to move and bring the holding member 751 toward the resisting member 735. The elastic assembly 78 is compressed between the holding member 751 and the resisting member 735. Then a moment is produced by the elastic force of the elastic assembly 78 for balancing the gravity moment of the robot arm 50

The balancing mechanism 70 has a very simple configuration arrangement, including only the balancing body 73, the pulling rod assembly 75, and the elastic assembly 78. The elastic assembly 78 resists between the resisting member 735 and the holding member 751. The holding member 751 can move toward the resisting member 735 to compress the elastic assembly 78 by means of the pulling rod assembly 75. The elastic assembly 78 of the balancing mechanism 70 can produce a balancing moment against the gravity moment of the robot arm 50. As a result, the balance and stability of a robot configured with the balancing mechanism 70 will be much improved.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A balancing mechanism configured for a robot, the robot having one or more robot arms, comprising:
   a hollow balancing body comprising an opening;
   an elastic assembly received in the balancing body;
   a bracket comprising a fixing portion and two supporting arms, the two supporting arms extending from opposite sides of the fixing portion and rotatably connected with the balancing body, wherein a first direction X axis is defined, a second direction Y axis is defined to be substantially perpendicular to the first direction X axis, and a third direction Z axis is defined to be substantially perpendicular to the first direction X axis and the third direction Z axis, the fixing portion extends along a direction substantially parallel to the second direction Y axis, the two supporting arms extend toward a same side of the fixing portion, each of the two supporting arms is inclined to a direction substantially parallel to the third direction Z axis; and
   a pulling rod assembly, wherein the pulling rod assembly is received in the balancing body and hinged to the robot arm, one end of the pulling rod assembly resisting the elastic assembly, and an another opposite end of the pulling rod assembly extending out from the balancing body through the opening, and the pulling rod assembly movably assembled with the balancing body via the elastic assembly to make the elastic assembly generate a balancing moment against a gravity moment of the robot arm.

2. The balancing mechanism of claim 1, wherein the pulling rod assembly comprises a pulling rod and a holding member fixed to one end of the pulling rod, the other end of the pulling rod away from the holding member extending out from the balancing body through the opening.

3. The balancing mechanism of claim 2, wherein the balancing body comprises a housing and a resisting member, the opening is defined on an end of the housing, the resisting member is assembled with the housing to cover the opening of the housing, the elastic assembly resists between the holding member and the resisting member, and the pulling rod passes through the resisting member.

4. The balancing mechanism of claim 3, wherein a first annular resisting portion and a second resisting portion are separately formed on the resisting member, and the second resisting portion is adjacent to an edge of the resisting member.

5. The balancing mechanism of claim 4, wherein the holding member comprises a holding surface facing the resisting member, a first holding portion and a second holding portion are formed at the holding surface corresponding to the first annular resisting portion and the second annular resisting portion.

6. The balancing mechanism of claim 5, wherein the elastic assembly comprises a first elastic member and a second elastic member received in the first elastic member, the first elastic member resists between the second holding portion and the second annular resisting portion, and the second elastic member resists between the first holding portion and the first annular resisting portion.

7. The balancing mechanism of claim 2, wherein the elastic assembly sleeves on the pulling rod.

8. The balancing mechanism of claim 7, wherein the elastic assembly comprises a first elastic member and a second elastic member received in the first elastic member, the first elastic member and the second elastic member are sleeved on the pulling rod.

9. The balancing mechanism of claim 2, wherein a plurality of fixing blocks are separately formed at an outer round edge of the opening, and a plurality of installing portions are formed at a flange of the resisting member corresponding to the fixing blocks for fixing the resisting member to the housing.

10. The balancing mechanism of claim 2, wherein the pulling rod assembly further comprises a connecting block, the connecting block includes a joint and a mounting portion connected with the joint, the mounting portion is connected with the pulling rod.

11. The balancing mechanism of claim 2, wherein the pulling rod assembly further comprises a clamping member, the pulling rod passes through the holding member and finally fixed by the clamping member.

12. A robot comprising:
a base;
a support body rotatably positioned at the base around a first axis;
a robot arm rotatably connected with the support body around a second axis perpendicular to the first axis;
a balancing mechanism, comprising:
a hollow balancing body comprising an opening;
an elastic assembly received in the balancing body;
a bracket comprising a fixing portion and two supporting arms protruding from opposite sides of the fixing portion, wherein a first direction X axis is defined to be substantially parallel to the first axis, a second direction Y axis is substantially parallel to the second axis, a third direction Z axis is defined to be substantially perpendicular to the first direction X axis and the third direction Z axis, the fixing portion extends along a direction substantially parallel to the second Y axis, the two supporting arms extend toward a same side of the fixing portion and away from the robot arm, each of the two supporting arms is inclined to a direction substantially parallel to the third direction Z axis, and the two supporting arms are rotatably connected with the balancing body; and
a pulling rod assembly received in the balancing body, one end of the pulling rod assembly resisting the elastic assembly, and an another opposite end of the pulling rod assembly extending out from the balancing body through the opening to connect with the robot arm, the pulling rod assembly movably assembled with the balancing body via the elastic assembly to make the elastic assembly generate a balancing moment against a gravity moment of the robot arm.

13. The robot of claim 11, wherein two pivoting portions are formed at an outer surface of the balancing body, the two pivoting portions are rotatably connected with the two supporting arms.

14. The robot of claim 12, wherein the support body comprises a first connecting portion and a second connecting portion, the balancing body is rotatably mounted on one end of the first connecting portion, the second connecting portion is extending upwardly from another end of the first connecting portion opposite to the balancing body.

15. The robot of claim 12, wherein a mounting board is formed on the end of the first connecting portion opposite to the second connecting portion, the fixing portion is mounted on the mounting board.

16. The robot of claim 12, wherein a pair of ears are separately formed on a side surface of the robot arm toward the balancing body, and the pulling rod assembly is hinged with the pair of ears.

17. The robot of claim 12, wherein the pulling rod assembly of the balancing mechanism comprises a pulling rod and a holding member fixed to one end of the pulling rod, and the other end of the pulling rod away from the holding member extending from the opening.

18. The robot of claim 17, wherein the pulling rod assembly of the balancing mechanism further comprises a connecting block, the connecting block includes a joint and a mounting portion connected with the joint, the joint is hinged with the robot arm, and the mounting portion is connected with the pulling rod.

19. A robot comprising:
a base defining a first axis;
a support body rotatably positioned at the base around the first axis;
a robot arm rotatably connected with the support body around a second axis substantially perpendicular to the first axis;
a balancing mechanism, comprising:
a hollow balancing body comprising an opening;
an elastic assembly received in the balancing body;
a bracket comprising a fixing portion and two supporting arms protruding from opposite sides of the fixing portion, wherein a first direction X axis is defined to be substantially parallel to the first axis, a second direction Y axis is substantially parallel to the second axis, and a third direction Z axis is defined to be substantially perpendicular to the first direction X axis and the third direction Z axis, the fixing portion is substantially parallel to the second direction Y axis and the third direction Z axis, two supporting arms extend toward a same side of the fixing portion and away from the robot arm, an angle formed between an extending direction of each of the two supporting arms and the fixing portion is less than 90 degrees, and the two supporting arms are rotatably connected with the balancing body; and a pulling rod assembly received in the balancing body, one end of the pulling rod assembly resisting the elastic assembly, and an another opposite end of the pulling rod assembly extending out from the balancing body through the opening to connect with the robot arm, the pulling rod assembly movably assembled with the balancing body via the elastic assembly to make the elastic assembly generate a balancing moment against a gravity moment of the robot arm.

* * * * *